United States Patent [19]
Pleva

[11] Patent Number: 5,652,007
[45] Date of Patent: Jul. 29, 1997

[54] METHOD OF MAKING A CURED CHERRY-CONTAINING MEAT PRODUCT

[76] Inventor: Raymond M. Pleva, 9101 S. Lake Shore Dr., Cedar, Mich. 49621

[21] Appl. No.: 691,894

[22] Filed: Aug. 1, 1996

Related U.S. Application Data

[60] Division of Ser. No. 624,293, Mar. 29, 1996, which is a continuation-in-part of Ser. No. 402,144, Mar. 10, 1995, Pat. No. 5,503,867, which is a continuation-in-part of Ser. No. 225,435, Apr. 8, 1994, abandoned, which is a continuation of Ser. No. 983,897, Dec. 1, 1992, abandoned.

[51] Int. Cl.$^6$ .............................. A23L 1/314; A23L 1/317
[52] U.S. Cl. .................................................. 426/265; 426/641
[58] Field of Search .................................... 426/265, 266, 426/646, 641

[56] References Cited

U.S. PATENT DOCUMENTS

| | | |
|---|---|---|
| 3,050,400 | 8/1962 | Poarch et al. . |
| 3,520,701 | 7/1970 | Rendek et al. . |
| 3,652,296 | 3/1972 | Wilkerson, Jr. et al. . |
| 4,504,515 | 3/1985 | Hohenester et al. . |
| 4,752,495 | 6/1988 | Smith . |
| 4,806,373 | 2/1989 | Stumpf et al. ............. 426/646 X |

FOREIGN PATENT DOCUMENTS

| | | |
|---|---|---|
| 2 530 423 | 1/1984 | France . |
| 1-112969 | 5/1989 | Japan . |

OTHER PUBLICATIONS

"Luau Links Among New Product Ideas Offered for Today's Consumer", *Food Engineering*, Oct. 1986, p. 31.
"Development of Low Fat Beef Patties with Added Dietary Fibers", Webb Technical Group, Inc., Nov. 1990.

*Primary Examiner*—Arthur L. Corbin
*Attorney, Agent, or Firm*—Varnum, Riddering, Schmidt & Howlett LLP

[57] ABSTRACT

A meat product containing one or more forms of uncooked cherries is shown. The meat product can be a comminuted meat mixture in which ground or chopped cherries are included in the mixture. Alternatively, cherry juice, or a slurry of cherry juice and cherry tissue, could be mixed with the meat to create a comminuted meat mixture according to the invention. In another aspect, uncooked cherry products could be used in preparing a meat product for curing. The meat products produced according to the invention have the benefits of enhanced lipid oxidation resistance, enhanced flavor, better natural color retention, and a reduction of undesirable elements, such as fat or sodium.

4 Claims, No Drawings

METHOD OF MAKING A CURED CHERRY-CONTAINING MEAT PRODUCT

RELATED APPLICATION INFORMATION

This is a division of application Ser. No. 08/624,293 filed Mar. 29, 1996 which is a continuation-in-part of Ser. No. 402,144, filed Mar. 10, 1995, now U.S. Pat. No. 5,503,867 issued Apr. 2, 1996, which is a continuation-in-part of Ser. No. 08/225,435 filed Apr. 8, 1994, now abandoned, which is a continuation of Ser. No. 07/983,897 filed Dec. 1, 1992, now abandoned.

BACKGROUND OF THE INVENTION

1. Field of the Invention

This invention relates to meat products, and more particularly, to the addition of uncooked cherries or products produced therefrom to the meat product. The invention also relates to a method of making a meat product including uncooked cherries or cherry by-products.

2. Description of Related Art

While great numbers of people are reported to be making a conscientious effort to restrict their consumption of fat and cholesterol, meat products remain a principal source of both in many diets. More than seven billion pounds of ground beef are, for example, consumed in the United States each year. Another scourge of the average diet is sodium, a known contributing factor to high blood pressure.

Palatability and acceptance of conventional ground beef and other comminuted meat products are closely related to fat content. As the proportion of fat is reduced in such products, there is a significant diminution of flavor intensity, tenderness and juiciness.

One attempt in recent years to mitigate these effects of fat reduction relied on the addition of water to lean ground beef, together with iota carrageenan and encapsulated salt and spices. Because of loss of water from such a mixture by evaporation, it was noted that it deteriorated quickly after any heating or cooking, by becoming dry and losing flavor, to the extent that the cooked product was unacceptable if held for any length of time under warming lamps or if consumed away from the premises where cooked.

Another attempt to compensate for fat reduction also required the addition of water to lean ground beef, but with the inclusion of substantial amounts of oat bran, spices and seasonings. Lactic acid and beef flavoring were among substances added to compensate for the loss of flavor from the lower fat content. This mixture, too, tends to dry out and lose flavor under heat.

The present inventor has for several years manufactured and sold sausage products enclosed in natural casings and comprising a mixture of ground fresh lean pork, pitted and ground tart cherries, dry milk powder, small amounts of salt and seasoning, and usually, but not always, chopped pecan kernels. The average proportion of cherries in the sausage mixture has been about 18 to 20 percent by weight, whereas the proportion of milk powder has not exceeded about four percent, and the proportion of pecan kernels has not exceeded about five percent.

Unknown to the present inventor until after he had begun the manufacture and sale of such sausage products was an article in *Food Engineering*, October 1986, at page 31, in which a product called "Luau Links" was described as "dinner-sized fresh link sausages with chopped cherries, pineapple, and parsley" and "skinless for easier eating". The ingredients were listed simply as "pork, pineapple, water, cherries, sweet and sour sauce, salt, sodium caseinate, and spices". The article does not provide proportions or measurements, nor does it describe the procedure for preparing such a mixture. The product had never been manufactured commercially or sold to the public, and in this regard it is noted that the present inventor's sausage products were the first cherry-containing meat products to receive label approval from the U.S. Department of Agriculture and the State of Michigan. It can be surmised that one reason why the "Luau Links" product did not reach the market was that the artificial casings employed to render it "skinless" would split promptly upon the application of heat due to the added water as well as the cherries and pineapple. However, this article contains the only prior suggestion by another party within the present inventor's knowledge that cherries (as contrasted with cherry flavoring) might be included in a comminuted meat mixture of any sort.

As noted above, another significant problem in the average diet is excessive mounts of sodium, a contributing factor to high blood pressure. A variety of processed meat products includes a significantly large mount of sodium for flavoring. For example, cured products such as ham and bacon are processed with sodium-based salts for flavoring. Typically, a brine solution is injected into the meat product. Alternatively, the meat product is immersed in a brine solution bath for a sufficient period of time. While the sodium-based salt achieves the goal of providing effective curing and flavor for the product, many persons having high blood pressure or heart disease problems cannot eat these products because of the high sodium content. Unfortunately, merely reducing the amount of sodium in these products is not an acceptable solution because the palatability and flavor is also reduced. Therefore, one problem present in the prior art is creating a reduced sodium cured meat product which is palatable to the prior consumer of traditionally cured meat products.

SUMMARY OF THE INVENTION

In one aspect, the invention provides a comminuted meat mixture free of added water and comprising by weight 100 parts of ground lean meat, 10 to 15 parts of pitted and ground uncooked cherries, 2 to 3 parts of oat bran, and small but effective amounts of salt and seasoning.

A preferred comminuted meat mixture according to the invention, also free of added water, employs lean beef, about 13.5 parts by weight of the uncooked cherries to 100 parts of the beef, and about 2.4 parts of the oat bran, as well as small but effective amounts of the salt and seasoning.

In the preferred embodiment, the cherries in the comminuted meat mixture are ground. Alternatively, the cherries can be chopped, squeezed, or mashed. In other words, the uncooked cherries can be added in the form of cherry tissue, as a slurry of cherry juice and cherry tissue, or solely as cherry juice.

In another aspect of the invention, cherry products are added to a cured meat product. Once again, the uncooked cherries can be added as cherry tissue which is either ground or chopped, a mixture of cherry tissue and juice, or solely as cherry juice. Preferably, cherry juice is used because it is more easily infused into the product to be cured.

It has been discovered that a meat product according to the invention achieves several unexpected results in comparison to other known meat mixtures, especially a low fat meat mixture. Specifically, the meat product according to the invention resists lipid oxidation in the refrigerated, frozen and cooked states. Therefore, the meat product will resist going rancid such that the shelf life of the meat product is increased.

A second unexpected result believed to be tied to the lipid oxidation resistance is the extended shelf life of a cooked meat product made according to the invention. "Warmed over flavor" is a term used to describe the patentability of a cooked food product which is reheated or kept warm for an extended period of time after cooking but before consumption. A meat product according to the invention develops an unacceptable warmed over flavor significantly later in time than similar low fat meat mixtures, again extending the shelf life of a cooked product.

It has also been discovered that when a comminuted meat mixture according to the invention is exposed to the heat of cooking, whether on a grill or in a broiler, pan or oven, a seal is immediately formed at its surface, whereby juices and moisture are retained within the mixture throughout cooking, to a much greater degree than might have been expected from experience with conventional comminuted meat mixtures. The seal is so effective that there is little or none of the flareup and spattering that occurs when ordinary meat products are cooked on a grill over burning charcoal, wood or gas.

As a consequence of the seal thus formed at the surface of the mixture, flavor intensity, tenderness and juiciness are enhanced in the cooked product to a great extent over conventional high-fat ground beef mixtures.

Precisely why this phenomenon occurs with the application of heat is not presently understood but is thought to be the result of chemical and physical interaction between the meat, the cherry tissue and the oat bran. In any case, it is thought that the cherry tissue replaces organoleptic and functional characteristics of fat.

In another aspect, the invention comprises a cured meat product including uncooked cherries provided in the curing brine and the method for making the same. All cured meat products utilize salt as the curing agent to assist in proper cooking of the product and flavoring for the product. The brine produced according to the invention includes cherry products added in one form or another. For example, cherry juice could be substituted for part or all of the water of the brine solution. Alternatively, a mixture of cherry juice and cherry tissue could be utilized. Alternatively, cherry tissue alone could be added to the brine solution. In most cases, the mount of salt required to properly cure the product is reduced by the addition of the uncooked cherry products. The cherry products also have the benefit of adding more flavor to the cured product.

Other features, advantages and objects of the invention will be apparent from the ensuing particular description.

THE PREFERRED EMBODIMENT AND METHOD

The invention centers around the addition of cherry and/or cherry products to different meat products. In the first embodiment, cherry products are added to a ground meat mixture to create a comminuted meat product. In the second embodiment, cherry products are added to a cured whole muscle or processed meat product as a partial substitute for sodium which is typically used as the curing agent.

This application includes several references to the phrase "cherry products." This term is used to identify any form of uncooked cherries. Preferably, the cherries are of the tart variety. However, sweet cherries can be substituted therefor. The cherry products can be used in any uncooked form including, but not limited to, pitted, ground cherries; pitted, cut cherries; cherry juice formed by squeezing the liquid from cherries; or a cherry slurry mixture formed from a blend of cherry juice and cherry tissue.

The first embodiment of the invention, and the preferred method for preparing it, begin with 100 parts by weight of beef, preferably about 91 percent lean and comprising flesh cuts from bull carcasses and cow carcasses in about equal mounts; about 13.5 parts by weight of whole individual-quick-frozen cherries which have been pitted prior to freezing and which are preferably of one or more of the red tart varieties; about 2.4 parts of oat bran by weight; about 0.8 part of common salt by weight; and about 0.1 part by weight of seasoning, preferably a mixture of black pepper and white pepper.

In the preferred method, the cherries must be ground in their frozen state, being forced from the grinder through exit apertures preferably 1/8 inch in diameter, so that the ground cherries will comprise small but distinct chunks of tissue or "cherry meat."

The lean beef cuts are ground and forced from the grinder through exit apertures of 1/8 inch in diameter. The ground beef base so provided is then placed in a commercial meat mixer, and the ground cherries and other ingredients are added while mixing. The mixer remains energized to blend the ingredients until they are mixed well, that is, thoroughly blended but not overblended. Mixing and blending time to do so is in the range of 45 seconds to 2 minutes, depending upon the size of the mixer.

It is important to note that no water is added in preparing the comminuted meat mixture.

After mixing, the comminuted meat mixture is reground and forced from the grinder through exit apertures of 1/8 inch in diameter. The mixture may then be formed into patties or packaged in bulk packs in conventional manner.

Varieties of red tart cherries are preferred over sweet varieties because they are relatively high in protein, carbohydrates, vitamin A, vitamin C and potassium; but sweet cherries may be substituted if it should become expedient to do so.

The quantity of cherries may be varied from 10 to 15 parts of the comminuted meat mixture by weight. Experience has shown that an unacceptable meat product results when the level of cherries in the mixture is substantially above or below this range. A meat mixture having cherries significantly below 10 parts such as 5 parts, will result in a cooked product which is unacceptably tough and unpalatable, especially a product based upon low fat meat. A meat mixture having cherries significantly above 15 parts, such as 20 parts, will have a cooked consistency which is too loose and is unpalatable. In addition, cherries in this high of an amount will begin to overpower the natural flavor of the meat product which is often unacceptable.

Though a mixture of black and white pepper is the preferred seasoning, other seasonings may be substituted according to taste. (Paprika may be prohibited by local law because it tends to color the comminuted meat. It is preferred that no artificial coloring agent be added to the comminuted meat mixture of the invention regardless of local requirements, since none is needed to provide a fresh-appearing, attractive comminuted meat.)

The preferred embodiment of the invention can be altered by utilizing different cherry products. For example, the preferred embodiment uses ground, quick-frozen tart cherries. However, virtually any form of uncooked cherries can be included in the meat product and still achieve the benefits according to the invention. For example, cherry juice, cherry slurry (a mixture of cherry tissue and juice) or chopped cherries could be added to the meat product and still achieve the benefits according to the invention. Virtually any form of uncooked cherry tissue or byproduct could be included in the meat product within the scope of the invention. Uncooked cherry products are the preferred embodiment for the invention. However, in some instances, a cooked cherry product could be substituted or blends of the cooked and uncooked cherry products could be used.

In the preferred embodiment, lean beef is the meat which is ground. The benefits achieved by the addition of ground, uncooked cherries to the comminuted meat mixture can be realized with any meat, including pork, poultry, lamb, buffalo, emu or ostrich. Use of any meat products with any comminuted meat mixture is within the scope of the invention.

One example of a comminuted meat product utilizing cherry juice formed from squeezed tart cherries and the method for preparing it begins with 100 parts by weight of beef, preferably about 91% lean and comprising fresh cuts from bull carcasses and cow carcasses in about equal mounts; about 13.5 parts by weight of cherry juice formed from squeezing one or more of the red tart variety cherries; about 2.4 parts by weight of oat bran; about 0.8 parts by weight of common salt; and about 0.1 parts by weight of seasoning, preferably a mixture of black and white pepper.

The lean beef cuts are ground and forced from the grinder through exit apertures of ⅛ inch in diameter. The ground beef base so provided is then placed in a commercial meat mixer and the cherry juice and other ingredients are added while mixing. The mixer remains energized to blend the ingredients until they are mixed well, that is, thoroughly blended but not overblended. Mixing and blending time to do so is in the range of 45 seconds to 2 minutes, depending upon the size of the mixture. It is important to note, as in the first embodiment, no water is added in preparing this embodiment of the comminuted meat mixture according to the invention. The mixing time varies depending upon the quantity of meat mixture being formed in the batch.

After mixing, the comminuted meat mixture is reground and forced from the grinder through exit apertures of ⅛ inch in diameter. The mixture may then be formed into patties or packaged in bulk packs in a conventional manner.

While the preferred embodiment according to the invention utilizes 13.5 parts by weight of cherry juice, an acceptable range of cherry juice is in the range of 8 to 17 parts by weight. Below this level, the benefits of including the cherry products in the meat mixture are de minimus, especially when used in a lean ground beef product. Cherry juice or a cherry slurry in excess of the upper limit creates additional problems in that more binder must be added to the mixture such as wheat, wheat rye, dry milk powder, or whey to compensate for the additional liquid. In addition, the flavor from the cherry product may begin to overpower the natural beef flavor. It is evident that a comminuted meat mixture according to the invention can include virtually any form of uncooked cherries ground, chopped, squeezed to create juice, or a slurry of juice and cherry tissue and still obtain the benefits according to the invention.

Product stability in the refrigerated, frozen and cooked states is a function of lipid oxidation. As the naturally occurring lipids in the meat product oxidize, the flavor and color of the meat products will change, eventually becoming rancid. Testing of a meat product including cherry products according to the invention has shown that lipid oxidation is slowed, thereby extending the shelf life of the product. The extended shelf life will reduce waste for meat producers and sellers and increase consumer satisfaction.

A meat mixture according to the invention seals itself when exposed to the heat of cooking, as described hereinabove; therefore, it remains moister and tastier than conventional ground beef. Equally important, there is much less shrinkage during cooking, whereby the improved mixture provides a higher yield of cooked product, by weight and volume, than can be realized using conventional ground beef mixtures.

Moreover, cooking time is reduced. For example, the cooking time for a two-pound meatloaf is reduced by 15 minutes from the cooking time required for an equivalent amount of conventional ground beef, while the reduction for a quarter-pound burger is approximately 2.5 minutes.

Also because of the seal formed during cooking, and the consequent retention of juices, less cleaning is required after cooking.

Testing has shown that the cherries act as a natural preservative, whereby the comminuted meat mixture of the invention enjoys a longer shelf-life than conventional ground beef mixtures. When kept frozen at zero to ten degrees Fahrenheit, for example, a mixture according to the invention will have a shelf-life of approximately one year.

An alternative use of uncooked cherries and cherry byproducts in a meat mixture is in a cured meat product in which the meat is not ground, but rather, is cured with a salt or brine solution which includes cherry products. The cherry products are added to the meat prior to curing to replace some of the required salt for curing the meat product. Cherry products can be included in any cured meat product such as ham, bacon, corned beef, and beef brisket. Cherry products can also be used with whole muscle meat products or products formed from cut or large ground pieces. The cherry products can be used with virtually any meat including beef, pork, poultry, lamb, buffalo, emu or ostrich.

Previously, cured meat products were formed by a variety of processes used to introduce a sodium salt-containing brine solution into the meat product. For example, a whole meat product could be hand-rubbed with a salt and spice mixture. Needles could be used to directly infuse the brine solution into the whole or formed meat product. Alternatively, the brine solution could be injected into the arteries of a whole meat product or the meat product could be soaked in a brine solution for a period of time, such as 24 to 48 hours. Alternatively, the meat product could be tumbled in a brine-containing dram. Regardless of the method used, the goal is to provide sufficient sodium-containing salt into or onto the meat product prior to the curing operation for safe curing and flavor enhancement.

Any of the processes described above can be modified by substituting uncooked cherry products for a portion of the sodium-containing salt in the brine solution. For example, in one known process for curing ham, a brine for use in curing the meat is formed by mixing 4 ounces of a nitrite-containing curing mixture, such as F. W. Witt Fast Cure, manufactured by F. W. Witt, Inc., Chicago, Ill.; 2 ounces of sugar; 2 ounces of brown sugar; 2 ounces of maple sugar; 1 pound, 8 ounces of salt, and 1 gallon of water. This brine mixture can be modified according to the invention by reducing the salt from 1 pound, 8 ounces to 1 pound, 2 ounces and substituting one gallon of cherry juice for the gallon of water.

In the brine mixture described above, all of the water is replaced with cherry juice. Alternatively, a blend of water and cherry juice could be utilized for the brine mixture. For example, the liquid solvent of the brine could be a 3 to 1 ratio of cherry juice to water, a 1 to 1 mixture of cherry juice to water or, alternatively, a 1 to 3 mixture of cherry juice to water. However, the latter mixture requires the addition of two ounces of salt to accommodate for the reduced cherry juice.

According to the invention, at least six ounces of salt are eliminated by substituting cherry juice for the water as the solvent for the brine solution. This substitution of cherry for both the water and a portion of the salt has the benefit of reducing the total amount of sodium-containing salt in the brine solution and the resulting meat product, while also obtaining the prementioned benefits of enhanced lipid oxidation resistance for the meat product. Once again, any form of uncooked cherries could be used depending upon the method for introducing the brine and cherry solution to the meat product. For example, when the meat product is directly infused with infusion needles, it is necessary to use cherry juice rather than a slurry of cherry juice and cherry tissue. However,. when the meat product is tumbled or allowed to soak in a solution, a mixture of cherry tissue and juice could be used.

Another added benefit of inclusion of the cherry product in the cured meat product is the retention of good internal color of the meat along with enhanced taste.

Cured meat products are made by a whole host of different processes and brine mixtures. Experimentation will determine those mixtures which are best suited for the particular application. For example, a cured beef jerky product was formed with a cherry juice to water ratio of 1:7. Despite the small amount of cherry juice in the brine, a 25% reduction in salt in the brine solution was realized along with substantially more flavor for the final, cured product. The cherry juice to water ratio in cured meat products can be as low as 1:8 and still realize substantial flavor enhancement and reduction in brine salt. Any cured meat product incorporating uncooked cherries in any form falls within the scope of the invention.

The chemical reactions taking place when uncooked cherry products are added to meat mixtures and cured meat products are not fully understood at this time. However, what is clear is that the uncooked cherry products provide enhanced lipid oxidation resistance, thereby extending the shelf life, while simultaneously providing enhanced flavor and color for the product. A byproduct of the enhanced flavor provided by the uncooked cherry products is that other flavoring agents, such as salt, can be reduced thereby creating a healthier product with equal or superior flavor compared to products not including uncooked cherry products.

While the invention has been described in connection with a specific embodiment thereof, it will be understood that this is by way of illustration and not of limitation, and that the scope of the appended claims should be construed as broadly as the prior art will permit.

The embodiments for which an exclusive property or privilege is claimed are defined as follows:

1. A method of making a cured meat product comprising the steps of:

providing meat tissue;

providing a brine solution comprising a curing agent, salt, and a solvent wherein at least a portion of the solvent comprises a blend of cherry tissue and cherry juice;

exposing the meat tissue to the brine solution; and curing the meat following the exposure of the meat to the brine solution.

2. A method of making a cured meat product according to claim 1 wherein the solvent comprises a blend of water, cherry tissue, and cherry juice.

3. A method of making a cured meat product according to claim 2, wherein the cherry tissue/juice blend to water ratio is about 1:8.

4. A method of making a cured meat product according to claim 1, wherein the meat tissue is selected from the group comprising beef, pork, poultry, lamb, buffalo, emu and ostrich.

* * * * *